Nov. 24, 1964

C. A. COBEN 3,158,853

TIMER DRIVEN PUNCHED TAPE FOR OPERATION OF
SIGNAL CONTROLLING SWITCH

Filed Nov. 14, 1960

Inventor:
Charles Albert Coben
By Baldwin & Wight
Attorneys 3,158,853
TIMER DRIVEN PUNCHED TAPE FOR OPERATION
OF SIGNAL CONTROLLING SWITCH
Charles Albert Cohen, 25 Carlton Green,
Redhill, England
Filed Nov. 14, 1960, Ser. No. 68,753
6 Claims. (Cl. 340—309.1)

This invention relates to timed signalling systems and in particular to systems which are pre-set to cause the emission of signals at predetermined points in time.

It is the object of the invention to provide a simple and inexpensive device or apparatus which will cause signals to be emitted at set times for a variety of purposes. The device is particularly applicable to systems for causing the sounding of warning bells or other audible devices or for starting and stopping machinery and processes at set times automatically.

It is a further object of the invention to provide a device in which the programme of signals can be readily altered by an unskilled or semi-skilled operator.

In accordance with the invention, there is provided a device for causing the emission of signals at predetermined times comprising a clock mechanism having drive means, a movable chart element such as a tape or strip adapted to be driven by the drive means synchronously with the clock mechanism, a sensing device operable by marks formed in or on the chart element and adapted to cause generation of a signal, and a marker for applying marks to the chart element at positions along its length corresponding to the position of the sensing device relative to the chart element at predetermined points in the time cycle of the clock mechanism.

The marks may be of any form applicable to detection by a sensing device, and may include deformations such as notches or holes in the material of the chart element, e.g. tape or strip, optically detectable marks such as areas of opacity in a transparent tape or strip, or magnetic marks.

Preferably the device includes a marker actuatable at will to mark the tape at any required position along its length corresponding to the position of the sensing device relative to the tape at a predetermined point in the time cycle of the clock. Most conveniently, the marker is located at the same position as the sensing device so that the mark can be readily made in the correct position for sensing to correspond with a point in the time cycle transiently shown by an indicator such as a clock face.

Preferably the tape or strip is in the form of an endless flexible band provided with perforations and the drive means has sprocket teeth which engage with perforations of the band and which is rotatable once for each time cycle of the clock mechanism. With such an arrangement the length of the band is chosen so that it moves through one complete cycle for an integral multiple number of rotations of the clock mechanism. For example, using the conventional 12 hour clock, the driving sprocket is arranged to rotate once each hour and the length of the band may be suitably 12 times the circumference of the sprocket.

In one preferred embodiment, the band is of metal or plastic and is marked by notches, the sensing device being a microswitch having a feeler adapted to actuate the switch when it encounters a notch in the band.

In order that the invention may be clearly understood, a preferred embodiment by way of example will now be described with reference to the accompanying drawings wherein.

Figure 1:
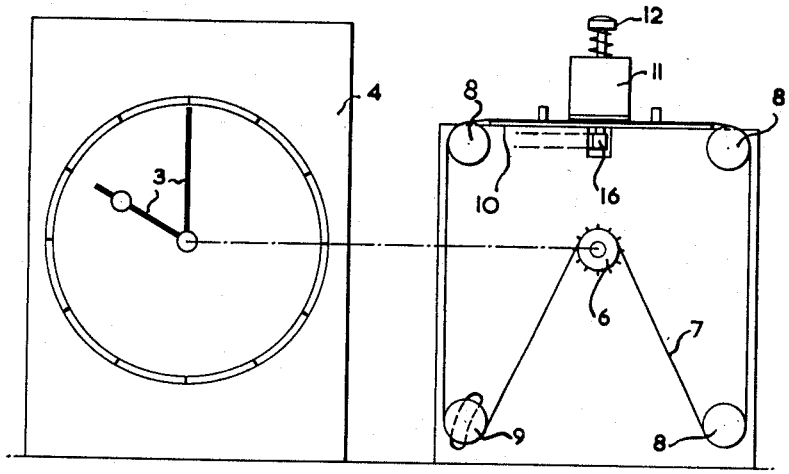
FIGURE 1 shows a face and rear view of a conventional electrically driven clock mechanism incorporating the device.
Figure 2:
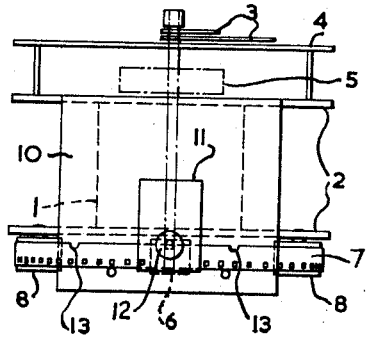
FIGURE 2 shows a plan view of the clock mechanism.

The clock used in the embodiment includes a synchronous electric motor 1 installed between plates 2, and driving clock hands 3 mounted on a clock face 4 through a gear box 5.

The clock main shaft which rotates once per hour and drives the minute hand carries a sprocket 6 at the back of the clock. The sprocket 6 is in engagement with a chart element, in the form shown an endless perforated band 7 of a flexible plastic, for example, Celluloid. The band is carried round idler wheels 8 so that it forms a flat run adjacent the top edge of the back plate 2 of the clock and is tensioned by a spring biassed pulley 9. A horizontal plate 10 supported by the top edges of the plates 2 carries a spring loaded punch 11 operable by depression of a plunger 12 to produce notches 13 in one edge of the band.

The band is of sufficient length that it will rotate once for every 12 revolutions of the sprocket 6. It will, therefore, be seen that if the clock motor is stopped and the hands set to, for example, 10 o'clock and the punch operated, a notch is formed in the band which will always be positioned immediately below the punch each time the clock face shows 10 o'clock when the clock motor is running.

Located on the under side of the plate 10 and immediately below the punch 11 is a sensing mechanism more clearly shown in FIGURE 3. The sensing mechanism comprises a microswitch 14 operable by a hinged lever 15 which carries a feeler 16 located directly below the plunger 12 of the punch 11.

Figure 3:
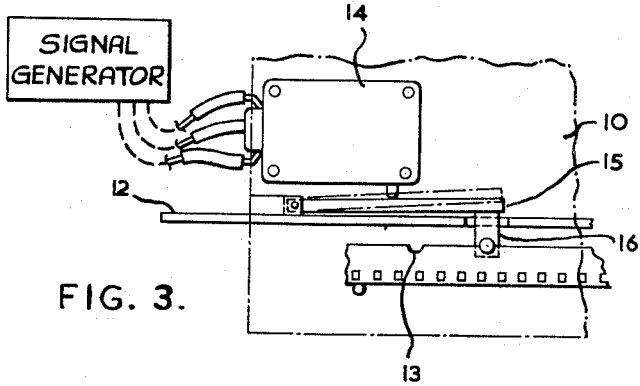
FIGURE 3 shows on an enlarged scale a portion of the mechanism in plane with parts cut away for the purpose of clarity.

When unnotched parts of the band 13 are carried past feeler 16, the lever 15 is positioned as shown by the dot/dash lines in FIGURE 3 and switch 14 is inoperable. As soon as a notch 13 is brought into register with the feeler 16, by the movement of the clock, the feeler 16 enters the notch allowing the lever to take up the position shown in full lines in FIGURE 3 and operating the microswitch 14. Operation of the switch can be used to open or close any desired electrical circuit thus causing the emission of a signal to initiate the sounding of a warning bell or time signal or to commence or terminate a manufacturing or testing process.

It will readily be seen that a band such as that shown can be programmed by forming notches in its length to correspond to a variety of times shown on the clock face. Moreover, the length of the tapes can be extended as required to cover a programme lasting 24 hours, 48 hours, 7 days or any other time interval which is a multiple of one hour. It should also be understood that the signal programme can be readily altered by removing the band and replacing it with a new band which can then be punched with the new programme.

Where two signals are to be initiated successively at time intervals which are very close together, a limitation in the proximity of the signals is caused by the physical limitations in placing two successive notches immediately adjoining or overlapping. This difficulty may be overcome by employing two sensing devices with their feeler members located on different sides of the tape, together with two punches to form two distinct lines of notches, and forming the perforations by which the tape is driven along the centre line of the tape instead of adjacent one edge as is shown in the embodiment illustrated. Using both sides of tape in this way, notches may be spaced a mere fraction apart in time. The invention clearly lends itself to additional modifications in which the notches are replaced for holes in the tape which may be spaced apart in lines along the tape length and which by the use of appropriate feelers can initiate series of signals which are separated by mere fractions of the time interval represented by the length of the tape.

It should also be understood that the invention is not limited to a conventional 12 hour clock mechanism. A clock mechanism can, for example, be arranged to rotate once per minute and signals could be programmed as closely as fractions of a second apart. Such programming may be of particular value in the laboratory. Alternatively the clock mechanism can be of the 24 hour variety or any other convenient periodicity.

What is claimed is:

1. A device for causing the emission of signals at predetermined times comprising a clock mechanism, a chart element of plastic sheet material an edge of which is notched in at least one predetermined position, a sensing device mounted for movement in the plane of the sheet material, drive means for moving said chart element synchronously with said clock mechanism with the said edge of the chart element in contact with the sensing device, a signal generating means incorporating an electrical circuit, and a switch in said circuit actuated by movement of the sensing device in the plane of the sheet material when the sensing device encounters a notched position in said edge of said chart element whereby a signal is generated.

2. A device according to claim 1 wherein the chart element is an endless flexible band.

3. A device for causing the emission of signals at predetermined times comprising a clock mechanism, a chart element of plastic sheet material, a punch actuatable to cut notches in an edge of the sheet material of the chart element, a sensing device mounted for movement in the plane of the sheet material, drive means for moving said chart element synchronously with said clock mechanism with the said edge of the chart element in contact with the sensing device, a signal generating means incorporating an electrical circuit, and a switch in said circuit actuated by movement of the sensing device in the plane of the sheet material when the sensing device encounters a notch cut in said edge of said chart element by said punch whereby a signal is generated at a point in the time cycle of the movement of the chart element.

4. A device according to claim 3 wherein the punch is located in the same position relative to the chart element as the sensing device.

5. A device for causing the emission of signals at predetermined times comprising a clock mechanism, an endless flexible band of plastic sheet material, a punch actuatable to cut notches in an edge of said endless flexible band, a sensing device mounted for movement in the plane of the sheet material, drive means for moving said endless flexible band synchronously with said clock mechanism with the said edge of the endless flexible band in contact with the sensing device, a signal generating means incorporating an electrical circuit, and a switch in said circuit actuatable by movement of the sensing device in the plane of the sheet material of the band when the sensing device encounters a notch position in said edge of said endless flexible band whereby a signal is generated.

6. A device for causing the emission of signals at predetermined times comprising a clock mechanism, an endless flexible band of synthetic plastic material having spaced apart perforations therealong, drive means driven by said clock mechanism and including a sprocket engageable with the perforations in said band for moving said band past a sensing point and synchronously with said clock mechanism over a distance equal to the length of said band in a time period which is an integral number, including one, times the time cycle of said clock mechanism, a punch located at said sensing point actuatable to cut notches in an edge of said band at predetermined points in the time cycle of said clock mechanism, means for generating a signal, and sensing means including a feeler mounted for movement in the plane of the band at said sensing point and adapted to actuate said signal generating means upon movement of the feeler in the plane of the band upon engagement with a notch in said edge of said band.

References Cited in the file of this patent
UNITED STATES PATENTS

| | | |
|---|---|---|
| 181,239 | Anders | Aug. 22, 1876 |
| 395,427 | Delany | Jan. 1, 1889 |
| 702,808 | Lyman | June 17, 1902 |
| 938,285 | Suren | Oct. 26, 1909 |
| 1,481,153 | Rosendahl | Jan. 15, 1924 |
| 1,780,610 | Weinlich | Nov. 4, 1930 |
| 2,482,615 | Fowler | Sept. 20, 1949 |
| 3,025,368 | Hibbard et al. | Mar. 13, 1962 |